United States Patent

Riva

Patent Number: 5,841,107
Date of Patent: *Nov. 24, 1998

[54] SHEET PERFORATION APPARATUS WITH HEATED NEEDLES AND A COMPLEMENTARY MOLD

[76] Inventor: Franca Riva, Via Vecchia Del Po 19, Sale, (Alessandria), Italy

[ * ] Notice: This patent issued on a continued prosecution application filed under 37 CFR 1.53(d), and is subject to the twenty year patent term provisions of 35 U.S.C. 154(a)(2).

[21] Appl. No.: 360,775
[22] PCT Filed: Jun. 17, 1993
[86] PCT No.: PCT/GB93/01259
§ 371 Date: Feb. 23, 1995
§ 102(e) Date: Feb. 23, 1995
[87] PCT Pub. No.: WO94/00278
PCT Pub. Date: Jan. 6, 1994

[30] Foreign Application Priority Data

Jun. 23, 1992 [GB] United Kingdom ............... 9213265

[51] Int. Cl.$^6$ ............... B65D 81/26; B26F 1/24
[52] U.S. Cl. ............... 219/243; 156/250; 156/510; 264/153; 425/423; 425/290
[58] Field of Search ............... 219/243, 221; 156/250, 251, 581, 583.1, 583.2, 583.7, 583.9, 510, 515; 83/170, 171, 15, 16; 264/404, 402, 442, 443, 153–156; 425/423, 810, 290

[56] References Cited

U.S. PATENT DOCUMENTS

| | | | |
|---|---|---|---|
| 2,244,550 | 6/1941 | Chandler | 164/90 |
| 2,510,383 | 6/1950 | Dalgleish | 156/251 |
| 2,522,079 | 9/1950 | Winstead . | |
| 2,633,441 | 3/1953 | Buttress . | |
| 3,033,257 | 5/1962 | Weber | 156/251 |
| 3,075,573 | 1/1963 | Piazze | 83/171 |
| 3,355,974 | 12/1967 | Carmichael | 83/171 |
| 3,465,627 | 9/1969 | Vigneault | 83/171 |
| 3,501,618 | 3/1970 | Spranger et al. | 83/16 |
| 3,517,410 | 6/1970 | Rapisarda | 425/423 |
| 3,525,279 | 8/1970 | Christian | 264/155 |
| 3,699,204 | 10/1972 | Ogata | 264/154 |
| 3,707,102 | 12/1972 | Huppenthal et al. | 83/171 |
| 3,738,903 | 6/1973 | Berwick et al. | 156/251 |
| 3,962,941 | 6/1976 | Kober | 83/228 |
| 4,094,729 | 6/1978 | Boccia | 156/583.1 |
| 4,160,055 | 7/1979 | Reed | 428/131 |
| 4,379,686 | 4/1983 | Chambers et al. | 425/290 |
| 4,402,660 | 9/1983 | Prusak | 264/155 |
| 4,582,555 | 4/1986 | Bower | 156/251 |
| 4,886,632 | 12/1989 | Iten et al. | 264/156 |
| 5,114,651 | 5/1992 | Warburton | 264/155 |

FOREIGN PATENT DOCUMENTS

| | | |
|---|---|---|
| 339593 | 11/1989 | European Pat. Off. . |
| 2132556 | 11/1972 | France . |
| 57-87919 | 6/1982 | Japan ............... 264/155 |
| 1037711 | 2/1964 | United Kingdom . |

*Primary Examiner*—John A. Jeffery
*Attorney, Agent, or Firm*—Sheridan Ross P.C

[57] ABSTRACT

An apparatus for shaping perforations of sheet material which comprises a first mold structure at one side of the sheet material and a complementary mold structure at the other side of the sheet material to cooperate with the first mold structure wherein the structures are arranged to be reciprocated and are capable of meeting approximately half way through the sheet material whereby to shape the perforations between them. The apparatus can include a needle so that perforations are simultaneously formed and shaped, or it may be used to shape pre-formed perforations. If a needle is included it may be of the ultrasonic type or it may be heated, e.g. electrically heated. If a needle is used, one of the mold structures may be defined by an appropriate formation on the needle, or the structure may be separate.

18 Claims, 6 Drawing Sheets

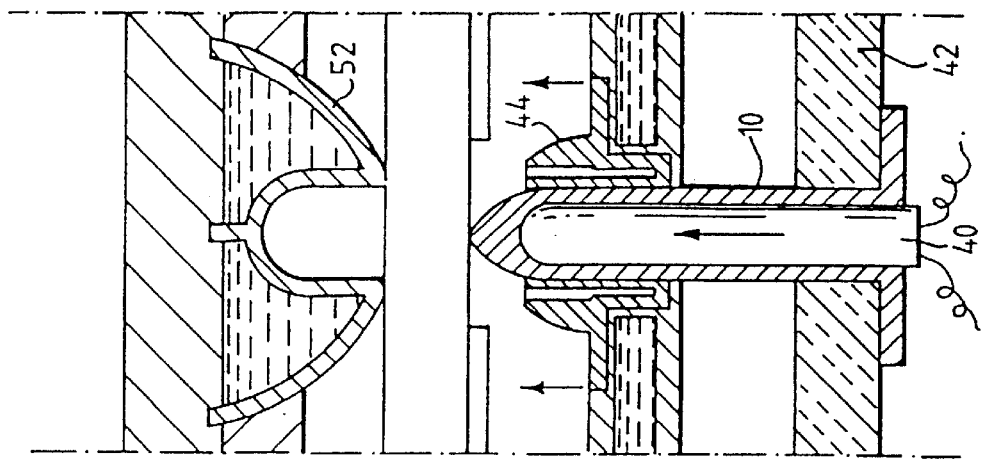
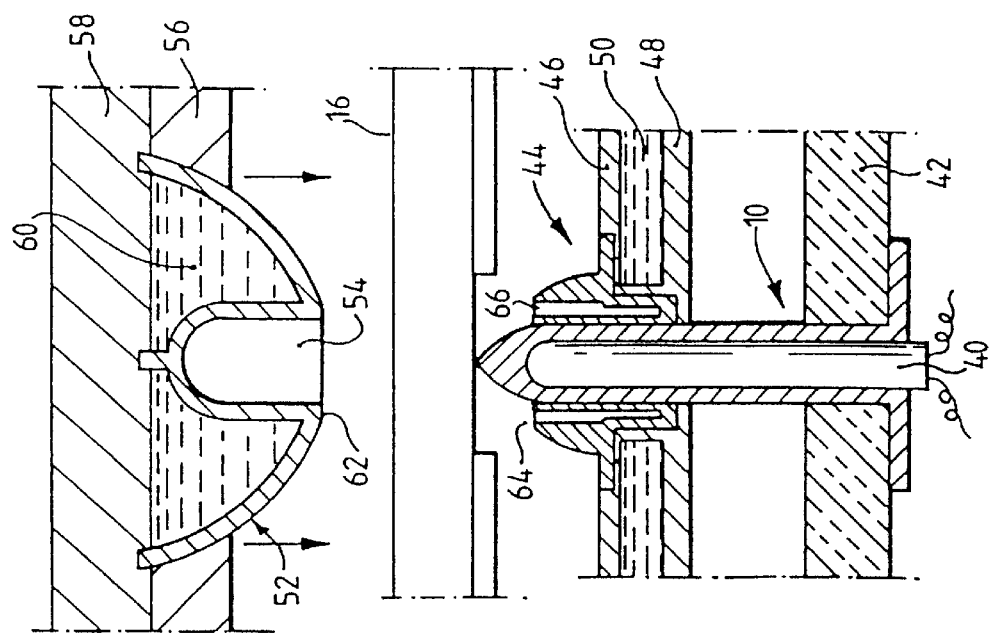

SHEET PERFORATION APPARATUS WITH HEATED NEEDLES AND A COMPLEMENTARY MOLD

FIELD OF THE INVENTION

This invention relates to a method and apparatus for perforating, or shaping the perforations of, thermoplastic sheets, for example plain or corrugated polyolefin sheets.

BACKGROUND OF THE INVENTION

Containers for the preservation and transport of food stuffs may be made from thermoplastic sheet material so as to be solid, light and economical. However, when used for the transport and storage of wares having a high moisture content, for example fruit or vegetables, deterioration of the product may occur owing to build up of moisture within the container. It has been proposed to provide such containers with a plurality of holes, for example by forming them from perforated sheets, and this reduces the problem considerably.

However, when the sheets are perforated with heated needles or punches alone, or similar techniques where direct heat is used to melt the material (including the use of lasers), the melted material forms a deposit, as indicated at 1 in FIG. 1 of the accompanying drawings. The deposit 1 is upstanding from the general plane of the face of the corrugated sheet and therefore provides a trap or barrier for retention of moisture 2 which can both lead to deterioration of the packed product, in particular fruit and vegetables, and unwanted variations of the tare (unloaded weight) of the package.

If perforation of the sheet is carried out using conventional ultra sonic equipment, as illustrated in FIG. 2 of the accompanying drawings, the moisture retention and stagnation problem is avoided but instead a different problem arises. This is the weakening of the whole structure due to the large sealing area 3 which is needed and the unbalanced deformation of the sheet as illustrated at 4, both of which affect the mechanical performance of the package. The present invention seeks to provide a method and apparatus for producing perforations in thermoplastic sheet materials which are improved in the above respects.

BRIEF SUMMARY OF THE INVENTION

According to the present invention there is provided an apparatus for shaping perforations of sheet material which comprises a first mold structure at one side of the sheet material and a complementary mold structure at the other side of the sheet material to cooperate with the first mold structure wherein the structures are arranged to be reciprocated and are capable of meeting approximately half way through the sheet material whereby to shape the perforations between them.

The apparatus can include a needle so the perforations are simultaneously formed and shaped, or it may be used to shape pre-formed perforations. If a needle is included it may be of the ultra-sonic type or it may be heated, e.g. electrically heated. If a needle is used, one of the mold structures may be defined by an appropriate formation on the needle, or the structure may be separate.

According to one example of the present invention, the needle may be an ultra-sonic electrode having one of the mold structures formed about its periphery spaced from its end and the method of perforating sheet material comprises placing a sheet of thermoplastic material beneath the ultra sonic electrode of the apparatus, bringing the electrode into contact with the sheet whereby to penetrate it until it contacts the structure, raising the structure until it and the electrode meet at a point approximately half way through the sheet, lowering the electrode once again and continuing to raise the cylinder until the upper peripheral portion of the cylinder contacts the complementary portion of the electrode comprising the mold structure approximately in the middle of the thermoplastic sheet whereby to finalise sealing thereof, and retracting the electrode and structure.

In another embodiment of the invention an electrically heated needle may be surrounded by a mold structure in relation to which it can reciprocate. A complementary mold structure is located on the other side of the sheet capable of receiving the needle. The needle perforates the sheet, immediately after which the complementary structures are brought together near the middle of the sheet and the needle is withdrawn.

In accordance with the invention it is possible to obtain a perforation of a plain or corrugated thermoplastic sheet material in which the area needed for sealing is reduced in comparison with prior art methods, down to as little as 1 mm, or is dispensed with completely; the perforated structure is balanced increasing, in many cases, the mechanical strength of the perforated sheet; and the shape of the perforation produced improves water drainage avoiding moisture stagnation inside the finished package.

The thermoplastic sheet may be formed from any suitable thermoplastic material, such as a polyolefin e.g. polyethylene or polypropylene.

The shape of the needle or ultra-sonic electrode may be chosen within wide limits. However, it has been found that a generally cylindrical main section having a tapered or conical end portion is suitable for penetrating the thermoplastic sheet. One of the mold structures may be defined by an outwardly disposed part circular portion at or near the upper end of the cylindrical portion which cooperates with a similar corresponding peripheral portion on the cylinder whereby to form a smooth half-circular section bead on the final perforated product.

The invention will be described further, by way of example, with reference to the accompanying drawings.

BRIEF DESCRIPTION OF THE DRAWINGS

FIGS. 5(a) to (e) are similar views to FIG. 4 of another embodiment.

DETAILED DESCRIPTION OF THE INVENTION

Figure 1:
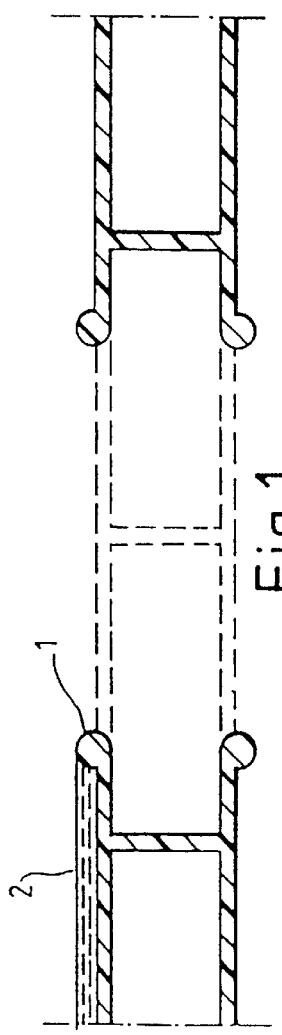
FIG. 1 is a partial sectional view of corrugated thermoplastic sheet material perforated in accordance with prior art hot needles.
Figure 2:
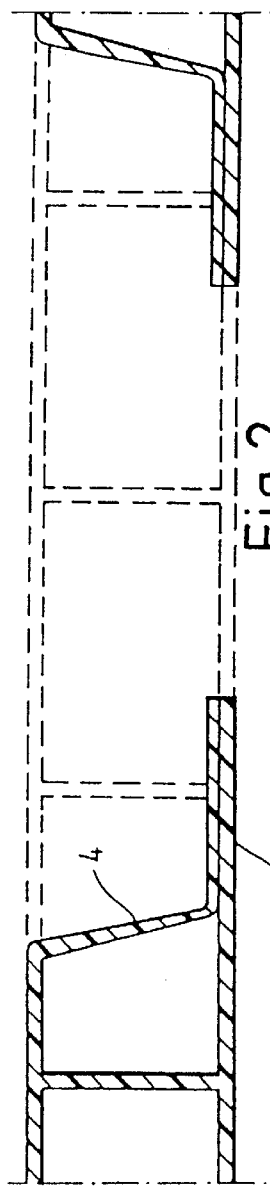
FIG. 2 is a similar view to FIG. 1 of a sheet perforated by a prior art ultra sonic method.
Figure 3:
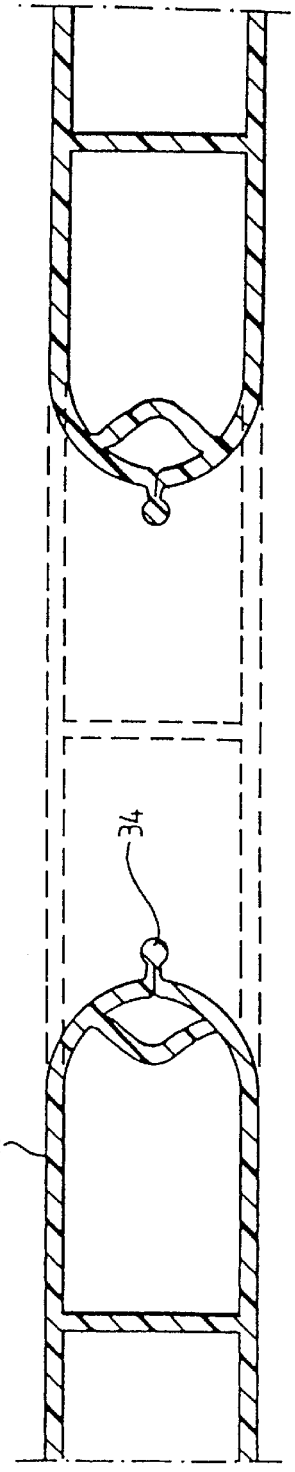
FIG. 3 is a similar view to FIG. 1 of a sheet perforated in accordance with the invention.

Referring to the drawings, and in particular FIG. 4, it will be seen that the apparatus of the invention in this embodiment comprises an ultra-sonic electrode generally designated 10 having a cylindrical main portion 12 and a conical tip 14. The electrode 10, for example a "Sonotrode", is positioned to reciprocate above a corrugated thermoplastic sheet 16. In a conventional ultra-sonic perforation system the sheet 16 would lie on a plate having holes therein to receive the electrode 10. However, in accordance with the invention, below each electrode 10 there is placed a mold structure generally designated 18 which comprises a cylinder 20 arranged for vertical reciprocation containing a piston 22 which is itself arranged for vertical reciprocation within the cylinder against the action of a working fluid or spring 24. The piston as illustrated has a shape very similar to the conical portion 14 of the electrode and is provided at its apex with a depression 26 which is of a shape corresponding to and is able to receive the extreme tip of the conical portion 14 of the electrode 10.

Figure 4C:
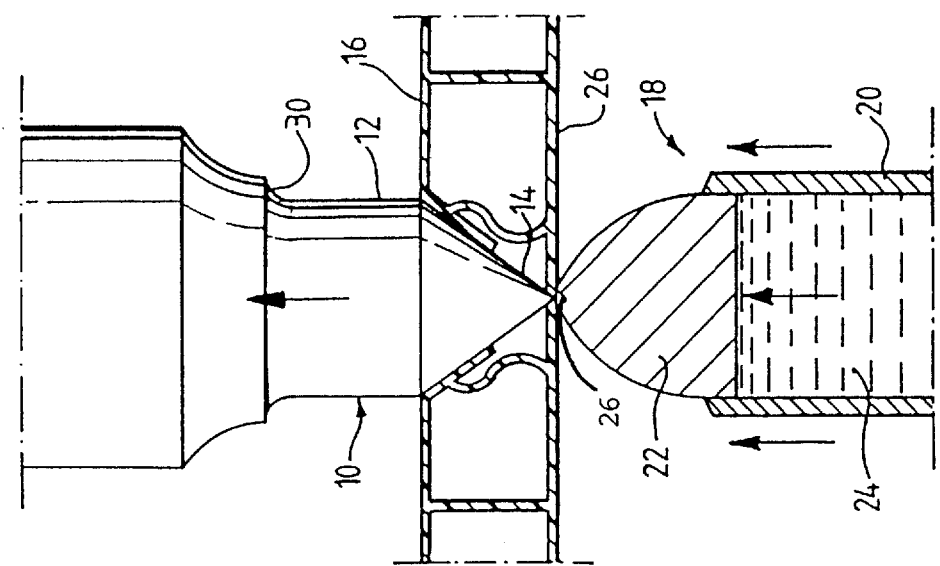
FIGS. 4(a) to (f) illustrates diagrammatically the phases of operation of the apparatus of one embodiment of the present invention.
Figure 4B:
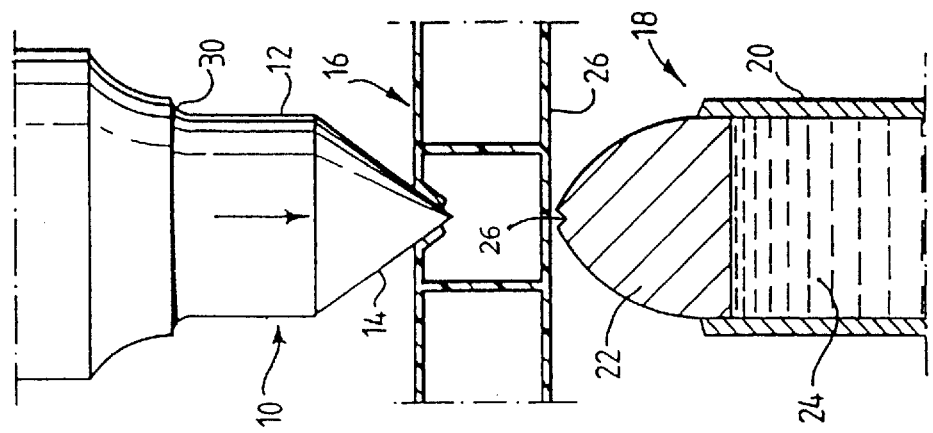
Figure 4A:
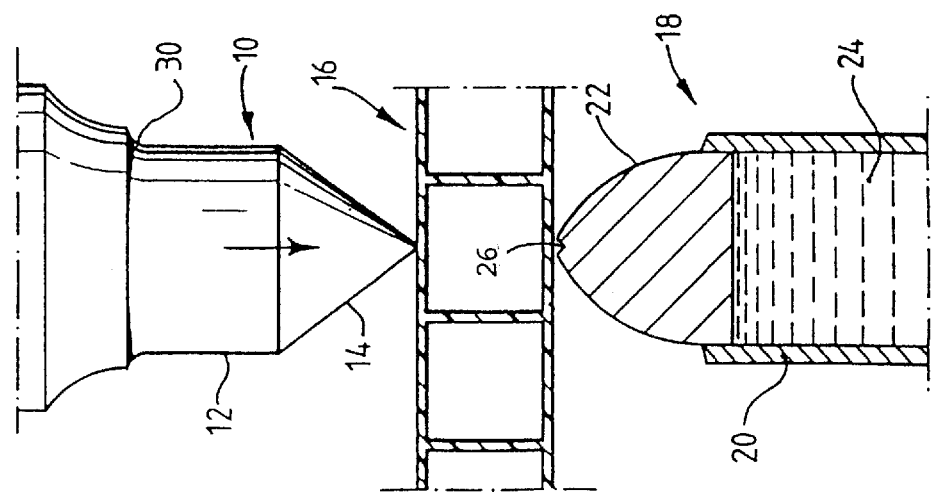
Figure 4F:
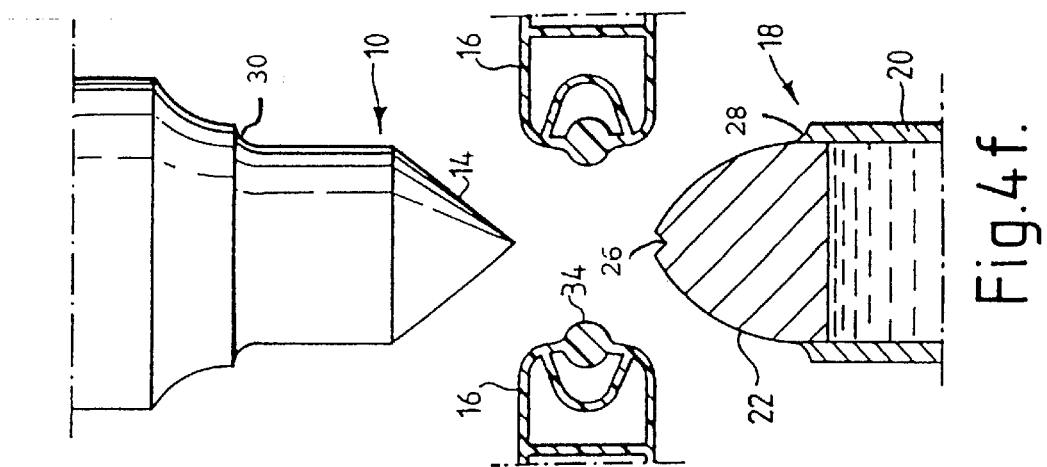
Figure 4E:
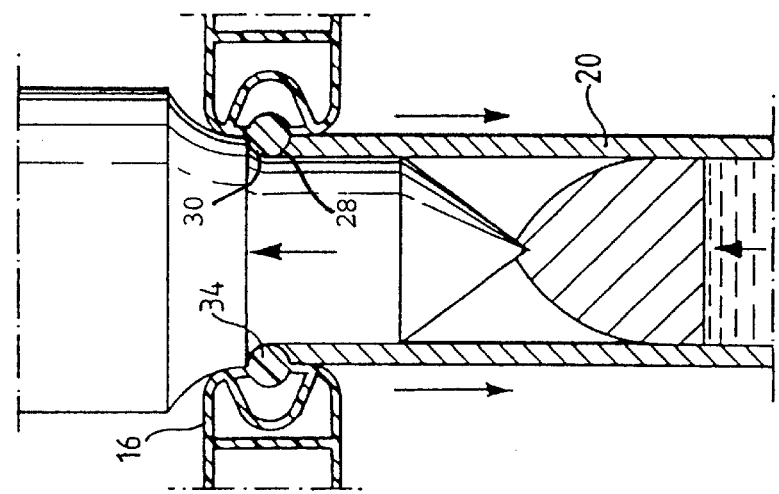
Figure 4D:
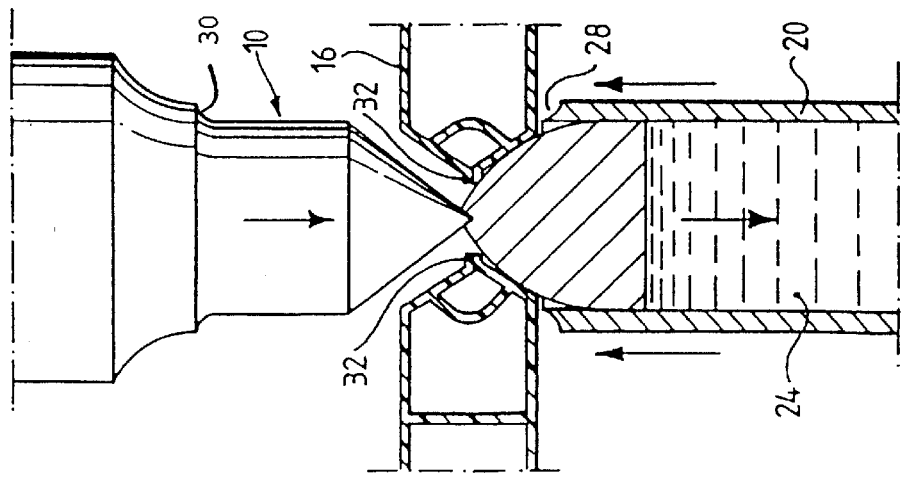

Operation of the apparatus is as follows. Starting in the position illustrated in FIG. 4A the ultra sonic electrode 10 is reciprocated vertically downwardly (in the direction of the arrow) where the ultra sonic vibration increases the temperature of the thermoplastic material and starts to soften it. As illustrated in FIG. 4B the electrode 10 begins to penetrate the material until it reaches the position shown in FIG. 4C. In these three phases the position of the structure 18 remains static as illustrated. However, once the FIG. 4C position is reached the structure 18 is moved upwardly, cylinder 20 and piston 22 together, and the needle 10 moves upward also. This continues to the position illustrated in FIG. 4D at which the electrode 10 and piston 22 meet at approximately the half way point of the strip of thermoplastic material 16. At this stage the cylinder continues to be moved upwardly whereas the electrode 10 starts to move downwardly pushing the piston 22 downwardly also against the pressure of the working fluid 24. This continues until the FIG. 4E position is reached. The upper peripheral surface 28 of the cylinder 20 is relieved to a part circular shape as illustrated in the drawings. A corresponding part circular portion 30 is provided above the main cylindrical portion 12 of the electrode 10, which constitutes a second mold structure. When the FIG. 4E position is reached these two mold shapes combine to mold the outstanding edges 32 of the perforated plastics material sheet into a bead 34 having a generally half circular external surface. The process is completed by the electrode 10 rising and the cylinder retracting while simultaneously the piston 22 is raised to the top of the cylinder 20 until the FIG. 4A position is reached once more when a fresh thermoplastic sheet 16 can be inserted for perforation.

The apparatus of FIG. 4 can be used, without the piston and associated elements, to seal holes formed by hot needles or other systems using direct heating. That is, effectively only the positions of FIGS. 4(e) and (f) are employed to produce the bead 34.

Figure 5D:
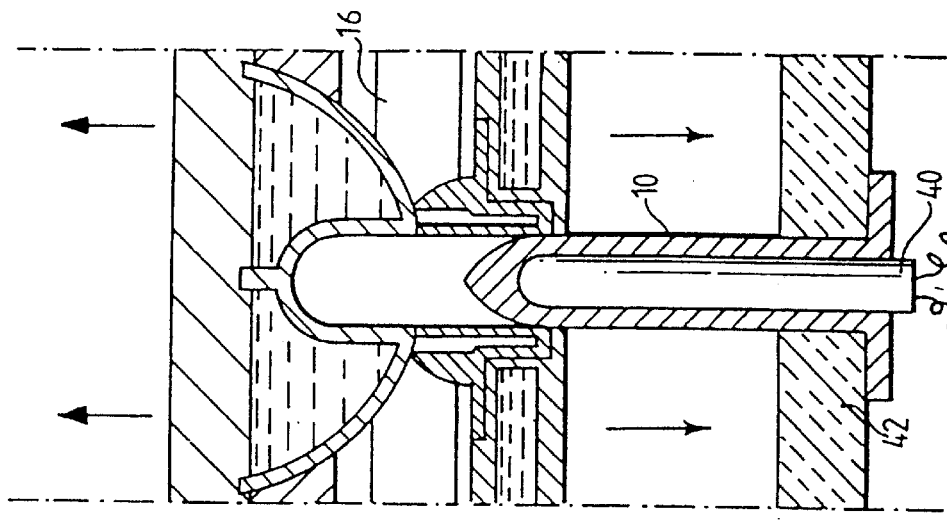

Turning now to FIG. 5 and using like numerals for like parts, the electrode 10 is replaced by a needle heated by an electrical element 40 fixed into a plate 42 of insulating material. The needle 10 is surrounded by a first mold structure generally designated 44 mounted between two plates 46,48. The space between the plates 46,48 can be filled with cooling water 50 or a heating fluid. The mold 44 can be changed easily by separating the plates and inserting a new one if a different shape, etc. is required. A second mold structure 52 is located on the other side of the sheet 16 and is shaped to receive the needle 10 in orifice 54.

The structure 52 is held between two plates 56,58 and can easily be changed by separating the plates. Cooling water 60 or a heating fluid fills the structure 52.

The lower peripheral portion 62 of the structure 52 cooperates with the upper peripheral portion 64 of the structure 44 to produce the bead 34 as explained hereinafter. The structure 44 may have channels 66 to receive and shape melted sheet material. As illustrated, the channels 66 produce the bead shape shown as 34b in FIG. 5(e), but changing the mold shape can produce other shapes of bead as shown at 34a and 34c, according to requirements.

Figure 5C:
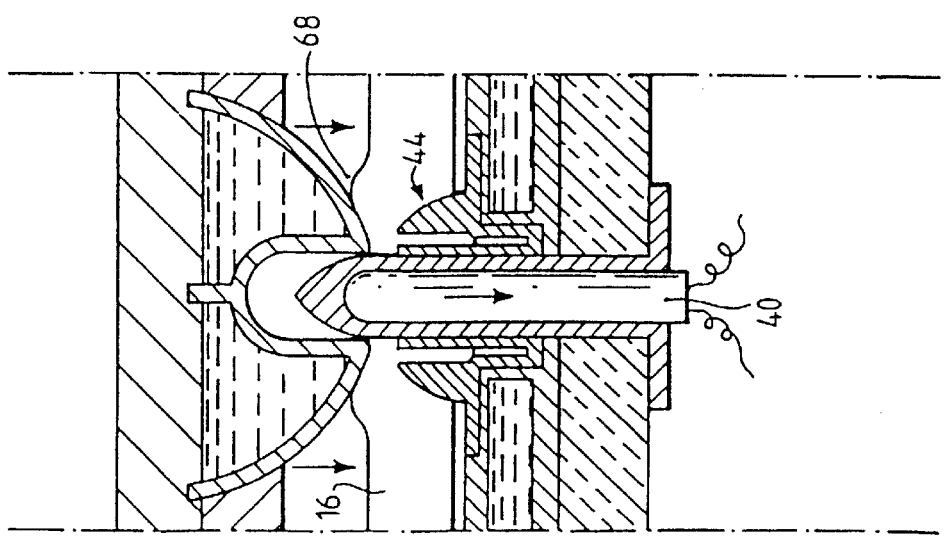
Figure 5E:
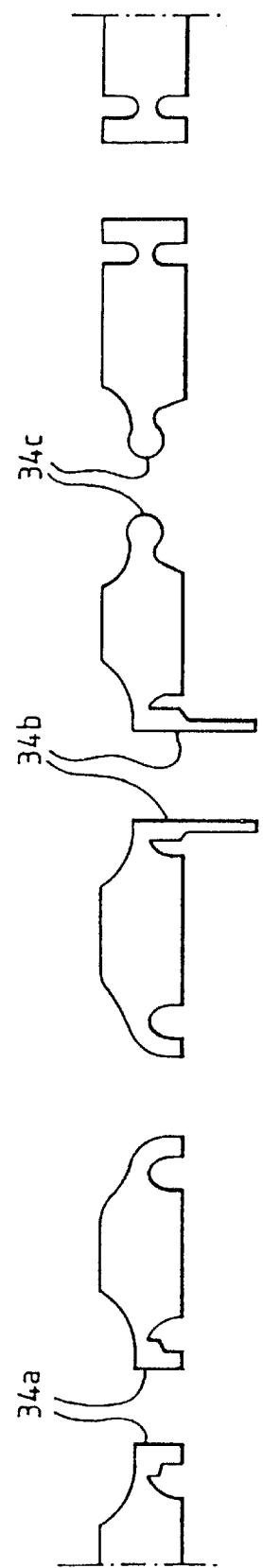

FIG. 5(a) illustrates the initial position with the needle 10 about to perforate the sheet 16. As the neeedle 10 and mold 44 move upwardly (FIG. 5(b)), the second structure 52 moves down. In 5(c) the needle has moved through the lower structure 44 and perforated the sheet 16, while the lower structure 44 has moved up so that its upper peripheral portion 64 is about midway through the sheet 16. Finally, in FIG. 4(d), the needle is retracted and, simultaneously or not, the upper structure 52 brought down to meet the lower structure 44 to form the bead 34 between them. The deformatiom 68 shown in FIG. 5(c) is eliminated by the mold 52, and the channels 66 receive melted material to form the bead shape illustrated as 34b in FIG. 5(e). A wide variety of hole shapes may be obtained as illustrated in FIG. 5(e).

The apparatus can be used, with or without the needle 10, to seal holes already produced. In this case it may be necessary to replace cooling fluid 50,60 with a heated fluid (e.g. hot oil) so as to soften the sheet sufficiently to enable the bead 34 to be formed.

It will be understood that an array of such needles/electrodes 10 and mold structures will be provided whereby simultaneously to perforate a sheet of any given area. Alternatively a line of electrodes and structures can be provided and the sheet indexed forward as perforation occurs.

The method of the invention produces a perforation in which the sheet structure is balanced after deformation and indeed in some cases it can increase the mechanical performance and mechanical strength of the perforated sheet—especially in contrast to conventional ultra-sonic sealing methods. In addition, the shape of the hole, having no barrier 1 on its upper face, dramatically improves water drainage and avoids moisture stagnation inside the finished package as well as reducing tare variation.

I claim:

1. An apparatus for shaping perforations in sheet material having at least a first planar surface, which comprises a first mold structure at one side of a sheet material, the first mold structure including a projection for forming a perforation in the sheet material, and a complementary mold structure at the other side of a sheet material adapted to cooperate with the first mold structure; the complementary mold structure including a concave surface for receiving an end of the projection, wherein both of said first and complementary mold structures are each arranged to be reciprocated and are adapted to meet approximately half way through a sheet material whereby to shape the perforations between them and reduce the formation of deposits on at least the first planar surface of the sheet material wherein at least one of the first and complementary mold structures includes a cylindrical member that is adapted to move in an opposite direction to another portion of the at least one of the first and complementary mold structures.

2. An apparatus as claimed in claim 1 in which the projection includes a needle attached to said first mold structure so that perforations are simultaneously formed and shaped.

3. An apparatus as claimed in claim 2 in which said needle is at least one of ultra-sonic or electrically heated.

4. An apparatus as claimed in claim 2 in which said needle is heated electrically.

5. An apparatus as claimed in claim 2 in which said first mold structure is defined by a formation on said needle.

6. An apparatus as claimed in claim 2 in which said needle comprises a generally cylindrical main portion and a conical end portion suitable for penetrating a thermoplastic sheet material.

7. An apparatus as claimed in claim 6 in which one of said mold structures is defined by an outwardly disposed part circular portion near an upper end of said cylindrical portion of said needle which cooperates with a similar corresponding peripheral portion on the other mold structure whereby to form a smooth half-circular section bead on the final perforated product.

8. An apparatus as claimed in claim 2 in which said mold structures are capable of reciprocation with respect to one another and independently of said needle whereby to form a bead.

9. An apparatus as claimed in claim 1 in which said mold structures are provided with associated reservoirs of fluid.

10. An apparatus for shaping perforations in sheet material having a planar surface, comprising:

(a) a needle comprising an end portion adapted to penetrate a thermoplastic sheet material and an outwardly disposed first mold structure near the upper end of said end portion, the outwardly disposed first mold structure being adapted to move in an opposite direction from the needle;

(b) a complementary mold structure adapted to cooperate with said first mold structure, the complementary mold structure comprising a concave surface for receiving an end of said needle, wherein both of said first and complementary mold structures are arranged to be reciprocated and are adapted to meet approximately half way through a sheet material whereby a bead is produced on the peripheral surface of the perforation.

11. An apparatus as claimed in claim 10 in which said needle is of the ultrasonic type.

12. An apparatus as claimed in claim 10 in which said needle is heated electrically.

13. An apparatus as claimed in claim 10 in which said first and complementary mold structures are adapted to reduce the formation of deposits on the planar surface of the sheet material.

14. An apparatus as recited in claim 10 in which said needle comprises a generally cylindrical main section and a conical end portion suitable for penetrating a thermoplastic sheet material.

15. A method for shaping perforations in thermoplastic sheet material having a planar surface, comprising:

(a) penetrating the thermoplastic sheet material with a needle attached to a first mold structure, said needle being located above the planar surface and comprising a cylindrical portion having an upper end and said needle being adapted to penetrate the thermoplastic sheet material wherein said first mold structure is defined by an outwardly disposed part circular portion near said upper end of said needle;

(b) contacting the needle with a complementary mold structure positioned below the planar surface wherein both of said first and complementary mold structures are arranged to be reciprocated; and (c) moving a central portion of at least one of the first and complementary mold structures in an opposite direction to a peripheral portion of the at least one of the first and complementary mold structures to produce a substantially smooth half-circular section bead on the peripheral surface of the perforation.

16. The method of claim 15, wherein during step (c), the central portion moves in the same direction as the other of the at least one of the first and complementary mold structures.

17. A method for shaping perforations in thermoplastic sheet material having a planar surface, comprising:

(a) penetrating the thermoplastic sheet material with a needle attached to a first mold structure, said needle being located above the planar surface, said needle being adapted to penetrate the thermoplastic sheet material;

(b) contacting the needle with a complementary mold structure positioned below the planar surface, wherein both of said first and complementary mold structures are arranged to be reciprocated; and (c) moving the first and complementary mold structures in the same directions to produce a perforation in the thermoplastic sheet material.

18. The method of claim 17, wherein during step (c), a central portion of the complementary mold structure moves in an opposite direction to an outer portion of the complementary mold structure.

* * * * *